US006789712B2

United States Patent
Gates et al.

(10) Patent No.: US 6,789,712 B2
(45) Date of Patent: Sep. 14, 2004

(54) OFFSET HOLDING DEVICE

(75) Inventors: George D. Gates, So. Jordan, UT (US); Travis D. Gates, Riverton, UT (US)

(73) Assignee: All Rite Products, Inc., West Jordan, UT (US)

( * ) Notice: Subject to any disclaimer, the term of this patent is extended or adjusted under 35 U.S.C. 154(b) by 478 days.

(21) Appl. No.: 09/941,513

(22) Filed: Aug. 28, 2001

(65) Prior Publication Data

US 2004/0020954 A1 Feb. 5, 2004

(51) Int. Cl.$^7$ ................................................. B60R 7/00
(52) U.S. Cl. ..................... 224/401; 224/420; 224/445; 224/446; 224/448; 224/913; 42/96; 211/64
(58) Field of Search ............................. 224/401, 410, 224/413, 420, 442, 443, 445, 446, 448, 450, 455, 460, 547, 550, 552, 555, 558, 560, 913, 916; 42/94, 96; 211/64, 89.01; 248/205.1, 222.12; D3/262; D12/406; D22/108

(56) References Cited

U.S. PATENT DOCUMENTS

| | | | | |
|---|---|---|---|---|
| 553,614 A | * | 1/1896 | Handloser | 224/442 |
| 4,607,772 A | * | 8/1986 | Hancock | 224/442 |
| 5,316,192 A | * | 5/1994 | Ng | 224/324 |
| 5,765,699 A | * | 6/1998 | Griffin | 211/70.6 |
| 5,957,352 A | * | 9/1999 | Gares | 224/401 |
| 6,199,734 B1 | * | 3/2001 | Meeks | 224/401 |
| 6,484,913 B1 | * | 11/2002 | Hancock et al. | 224/401 |
| 6,626,339 B2 | * | 9/2003 | Gates et al. | 224/401 |
| 6,641,014 B2 | * | 11/2003 | McNalley | 224/405 |
| 2003/0038150 A1 | * | 2/2003 | Williams | 224/401 |

OTHER PUBLICATIONS

Visual and textual depiction of ATV Fin Grip Rack product sold by All Rite Products, Inc. circa 1997.
Visual and textual depiction of ATV holder product sold by All Rite Products, Inc. circa 1986.

* cited by examiner

Primary Examiner—Stephen K. Cronin
(74) Attorney, Agent, or Firm—Thorpe North & Western, LLP

(57) ABSTRACT

An offset utility holding device configured to be attached to a cargo rack of a vehicle and to carry elongated objects includes a support base for attachment to a cargo rack of a vehicle, an offset mounting stem extending upwardly from the support base at an incline, and a holding member disposed atop the offset mounting stem. The holding member includes a "U"-shaped containment area having two upright arms which are open at the top for receiving an elongate object therein. The offset mounting stem places the holding member away from a cargo space directly above the cargo rack, such that the elongate object does not interfere with the cargo space.

24 Claims, 2 Drawing Sheets

US 6,789,712 B2

OFFSET HOLDING DEVICE

BACKGROUND OF THE INVENTION

1. Field of the Invention

The present invention relates generally to holding devices which may be anchored to a support structure. More particularly, the present invention relates to an offset holding device for holding objects disposed in the holding device away from obstructing space above the support structure below.

2. Related Art

There are many prior art systems for attaching a utility carrying device to an ATV or other vehicle. U.S. Pat. No. 4,607,772 discloses a utility carrying device which is mountable to the handlebars, cargo rack, frame, or other parts of a motorcycle, ATV, or other vehicle. There are various other carrier devices which are configured similarly. Such devices must securely hold the object to prevent it from coming loose due to jarring and vibrations which are typical with ATVs and other vehicles, especially off-road vehicles.

Prior art attempts to attach holding devices to a cargo rack of an ATV have generally been designed to extend vertically upward from the cargo rack or other portion of the ATV, thus placing the object contained in the holder directly above the rack. This interferes with full use of the space provided by the rack, and thus reduces the utility of the holding device and of the ATV. In addition, attachment of a general utility carrier is also frequently hampered by the limited frame space available for attachment.

SUMMARY OF THE INVENTION

It has been recognized that it would be advantageous to develop an object holder which does not interfere with the use of the cargo rack.

It has also been recognized that it would be advantageous to develop an object holder which is capable of locking an elongated carried item into place, so that it does not jar free from vibrations or bumps encountered by the vehicle.

The invention advantageously provides an offset utility holding device configured for attachment to a cargo rack of a vehicle for carrying elongated objects. The offset holding device comprises a support base configured for attachment to a cargo rack of a vehicle, an offset mounting stem extending upwardly at an incline from the support base, and a holding member disposed atop the offset mounting stem. The holding member includes a "U"-shaped containment area having two upright arms which are open at the top for receiving an elongate object therein. The offset mounting stem places the holding member away from a cargo space directly above the cargo rack, such that the elongate object does not interfere with the cargo space.

In accordance with a more detailed aspect of the present invention, the support base is pivotable on the rack, such that the holding member may be rotated to lock the elongate object in place.

Additional features and advantages of the invention will be apparent from the detailed description which follows, taken in conjunction with the accompanying drawings, which together illustrate, by way of example, features of the invention.

DETAILED DESCRIPTION

Figure 1:
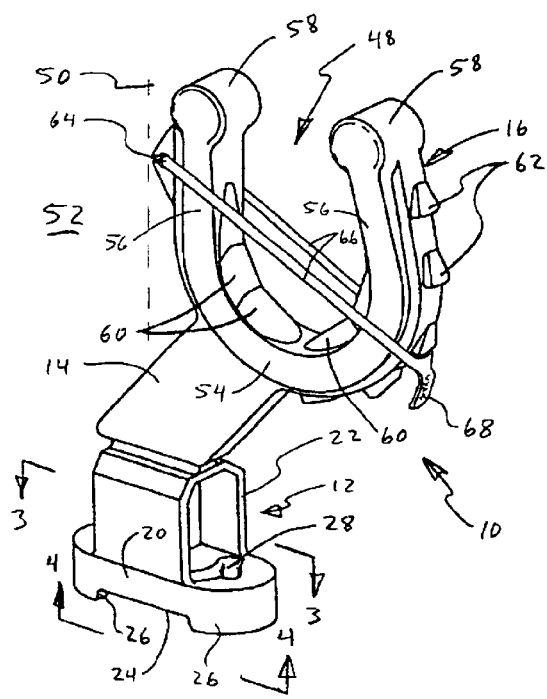
FIG. 1 is a perspective view of one embodiment of an offset holder in accordance with the present invention.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

An offset utility holding device 10 constructed in accordance with the present invention is shown generally in FIG. 1, and provides a holder which is attachable to a support structure such as a cargo rack of an ATV or other vehicle. The holding device 10 generally comprises a support base 12, an offset mounting stem 14, and a "U"-shaped holding member 16 atop the offset mounting stem.

The support base 12 is configured to be attached to a bar 18 of a cargo rack or other utility structure. Such utility structures may include a cargo rack of an ATV or other vehicle, a treestand railing, a treestand footrest, vehicle handlebars, a kickboat frame, etc. The support base 12 generally comprises a base member 20 and an upper portion 22. Viewing FIG. 4, the base member 20 has a bottom surface 24 with two outer flanges 26a, b, and two pivot flanges 27a, b. Disposed between the outer flanges and pivot flanges are opposite arcuate slots 28a and b.

Figure 2:
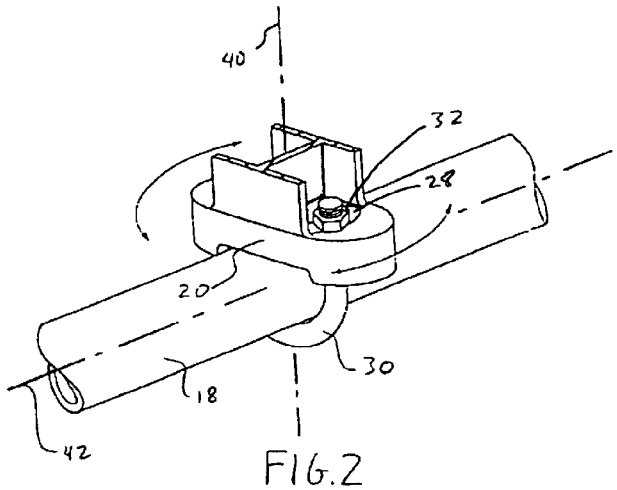
FIG. 2 is a partially sectional, perspective view of a twistable base of the holder of FIG. 1.
Figure 3:
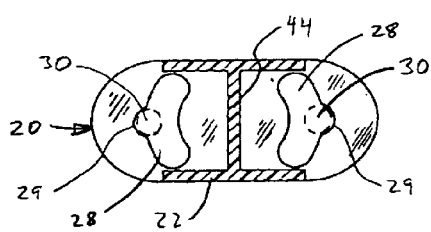
FIG. 3 is a cross-sectional view of the base of the offset holder of FIG. 1, taken along line 3–3.

The base member 20 includes a clamp means adapted for securely attaching the base member to the rack, while the upper portion 22 supports the offset mounting stem 14. The clamp means, as shown in FIG. 2, may comprise a u-bolt 30 disposed around the bar 18 of the support structure, and attached to the base member 20 through the arcuate slots 28a and 28b. As shown in FIG. 1 and FIG. 3, the arcuate slots may include rounded notches 29a, b, to allow the use of a larger (i.e. having a wider outer dimension) u-bolt if desired. Returning to FIG. 2, nuts 32 are disposed on threaded ends of the u-bolt to provide means for tightening or loosening the clamp means. The u-bolt 30 is configured to be tightened to grip the bar of the cargo rack or other utility structure and secure it against the bottom surface 24 of the base member. The support base 12 thus operates as a support for the holder 16, as well as providing a clamp means.

It will be apparent that the clamp means for securely attaching the base member to the rack may be configured in a variety of different ways. For example, viewing FIG. 6, rather than a u-bolt for attaching the base to a round bar or similar support structure, the base 20 may be attached to a flat surface or panel 80 with straight bolts 82. In this embodiment, the straight bolts pass through a mounting plate 84 on one side of the flat panel, through holes 86 in the panel, and into the slots 28, where they are fastened with nuts 32 in the manner described above. In this embodiment, the lower surfaces of the outer flanges 26a and b serve as the bottom surface of the base 20. The invention may thus be adapted to flat cargo racks in addition to railings and other support structures.

Figure 5:
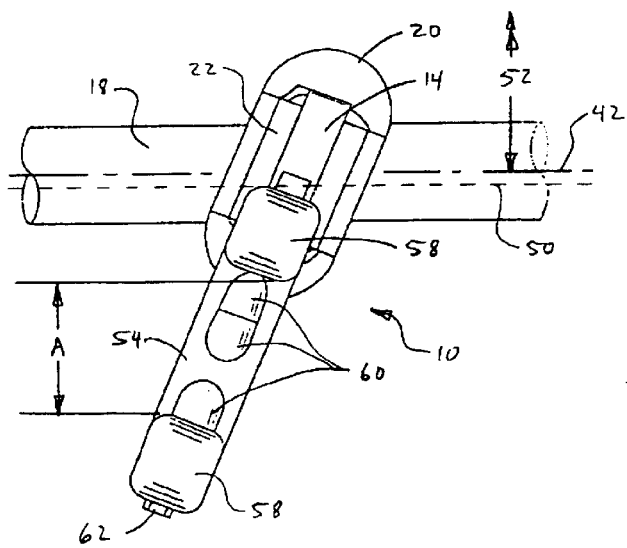
FIG. 5 is a top view of the holder of FIG. 1, showing the holder twisted on its base relative to the support bar.

As illustrated in FIG. 2 and FIG. 5, the support base 12 is pivotable with respect to the bar 18 of the cargo rack or utility structure, such that the holding member 16 may be pivoted to more securely grip elongate objects therein. More specifically, the base member 20 is pivotable about a substantially vertical axis 40, which is perpendicular to a long axis 42 of the bar 18, such that the holder 10 may be pivoted to more securely grip elongate objects disposed in the holding member.

Figure 4:
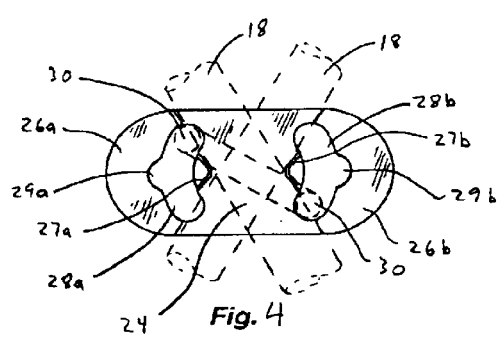
FIG. 4 is a bottom view of the base of the offset holder of FIG. 1, taken along line 4—4.

Because of the configuration of the arcuate slots 28a and b, and the pivot and outer flanges 27 and 26, respectively, of the base member, the orientation of the u-bolt 30 relative to the base member 20 is selectively adjustable, such that the base member may be secured to the bar in any of a plurality of angular orientations relative to the vertical axis 40. This feature is illustrated in FIG. 4, which shows the extreme alternative angular orientations of the bar 18 (shown in hidden lines) relative to the base member 20 and the u-bolt 30 (also in hidden lines). It will be apparent that the base member 20 will also pivot when mounted on a flat panel due to the arcuate shape of the slots 28a, b.

To pivot the base member 20 on the support structure, a user simply loosens the nuts 32, rotates the base member so that the ends of the u-bolt (or straight bolts) slide to a different position in their respective slots 28a and b, and tightens the nuts again. Alternatively, a user may tighten the nuts just enough to secure the orientation of the holder so that it does not move with vibration, etc., yet allows the holder to be rotated with sufficient manual effort by the user.

Viewing FIG. 5, the pivotable configuration advantageously enables the holder 10 to be rotated to effectively close or reduce the aspect A of the containment area relative to the long dimension of the elongate object, which is presumably parallel to the long axis 42 of the support bar 18. This allows for twist adjustment and locking, and allows the holder to fit objects of various sizes, while still providing a firm grip. The extreme alternative angular orientations of the bar 18 (shown in hidden lines) relative to the base member 20 are also shown in FIG. 4 to illustrate the pivotability or angular adjustment feature of the invention.

Returning to FIG. 1, the offset mounting stem 14 extends upwardly at an incline from the upper portion 22 of the support base 12. The upper portion 22 of the support base is configured with an I-beam structure 44 for strength (shown more clearly in the cross-sectional view of FIG. 3). The offset mounting stem 14 is fixedly attached at its bottom end to the upper portion of support base, and fixedly attached at its top end to a lower part of the holding member 16 at a point approximately below a center of the holding member. This point of attachment to the holding member provides solid support for the holding member, yet places a containment area 48 of the holder horizontally offset from a line 50 representing the perimeter of the cargo rack or other support structure, as shown.

The offset design orients an object in the holder 10 away from the ATV rack or support, and thus provides more space on the ATV. It does this by placing the holding member 16 away from a space directly above the utility structure, such that the elongate object does not interfere with the space directly above the utility structure. Viewing FIG. 1 and FIG. 5, the holding device may be attached to a cargo rack disposed on a vehicle, the cargo rack having a cargo space 52 vertically thereabove. The offset mounting stem 14 extends upwardly at an incline from the support base 12 to the holding member 16, and thus places the holding member substantially outside the cargo space 52.

Stated differently, the cargo rack has an edge which may be defined as a vertical plane coincident with the centerline 42 of the cargo rack bar 18. This edge represents the limits of the cargo space 52. The offset mounting stem 14 extends upwardly at an incline from the support base and away from the edge, such that the holding member is substantially outside the cargo space, beyond a vertical perimeter 50. The exact location of the vertical perimeter 50 will vary when the holder is pivoted, and may be directly above the edge of the cargo rack (i.e. above the centerline 42), or offset from the centerline in a direction away from the cargo space, as shown in FIG. 5.

The holding member 16 is designed to receive and carry a variety of elongated objects, such as a rifle, tools, sports equipment, etc. The holding member comprises a generally "U"-shaped member 54 having two upright arms 56 which are open at the top so as to define a containment area 48 configured to receive an elongate object. The holding member may include flexible rubber balls 58 atop the upright arms to help hold objects in the rack. It will be apparent that various shapes and methods of attachment of such rubber balls can be employed.

In one embodiment, the holding member 16 further comprises opposingly inclined resilient surfaces 60 disposed in the containment area 48 of the "U"-shaped member 54, for gripping objects placed therein. This design provides a tapering structure with internal angles to form fit and hold items of different diameters or sizes, and causes a contained object to nest in a secure position toward the base of the "U". The opposingly inclined resilient surfaces 60 are preferably formed of rubber material to securely grip the object. These surfaces also facilitate locking the object in place when the holder is rotated.

The holding member 16 may also include wedge-shaped hold-down attachments 62 disposed on an outside surface of the "U"-shaped member 54 for accommodating a hold-down member 66 for securing an object in the containment area 48. A hold-down loop 64 is disposed on an opposing side of the "U"-shaped member, allowing one end of the hold-down member 66 to be inserted therein. With an object in the containment area of the holding member, the opposing end of the hold-down member may be stretched over the object, and hooked or tied about one of the hold-down attachments 62 on the opposite outer side of the holding member. In this way, a secure grip may be provided for varied sizes of objects.

Figure 6:
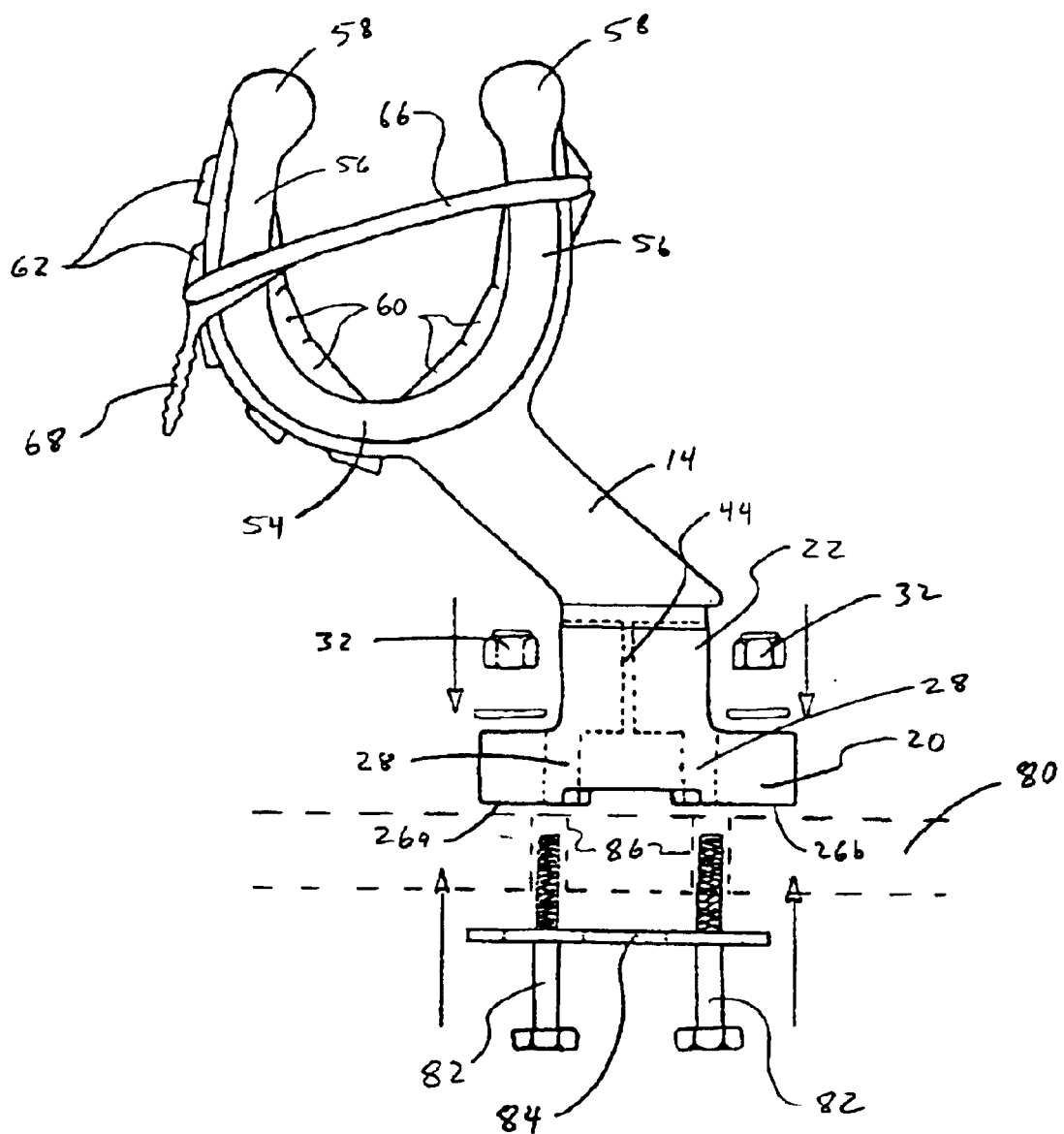
FIG. 6 is a side elevational view of an alternative embodiment of an offset holder having a base configured for attachment to a flat panel support structure.

Suitable hold-down members may include rope, string, elastic cord, or other such devices adaptable for securing or tying an object within the holding member. As depicted in FIG. 1 and FIG. 6, one type of elastic cord specifically suited as a hold-down member 66 is a snubber, which is a loop of elastic material with a tab 68 on one end. The tab is configured for grasping by a user, and allows the hold-down member to be quickly and easily attached or removed from the holder.

While a single holding device 10 as depicted in FIG. 1 may be used for some types of objects, or may be used in combination with some other support device for holding an elongate object, it will be apparent that a utility holding system comprising a plurality of holding devices 10 (usually two) is preferable. The two or more holding devices are typically attached to a cargo rack or other support structure, and are disposed with their holding members in alignment such that an elongate object may be supported by the two or more holders. To help secure the elongate object in the holders, each holder may be rotated to effectively close or reduce the aspect of the containment area relative to the long dimension of the elongate object.

The holding device in its entirety, or any of its constituent parts, may be constructed of numerous materials including metals, plastics, and rubber materials. In one embodiment, the entire holder 10 is injection molded of durable nylon material, and the mounting stem 14 and holder 16 are then provided with a thick coating of resilient Sanoprene rubber material. This rubber material provides excellent gripping and wear characteristics. Specific selection of materials will depend on the characteristics of weight, strength and function desired.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. An offset utility holding device configured to be attached to a utility structure and to carry elongated objects, comprising:
   a support base configured to be attached to the utility structure;
   an offset mounting stem extending upwardly at an incline from the support base;
   a holding member disposed atop the offset mounting stem, the holding member including a generally "U"-shaped member having two upright arms and being open at the top so as to define a containment area configured to receive an elongate object; and
   the holding member being disposed away from a space directly above the utility structure, such that the elongate object does not interfere with said space.

2. The utility holding device according to claim 1, wherein the holding member includes opposingly inclined resilient surfaces disposed in the containment area of the "U"-shaped member, for gripping objects placed therein.

3. The utility holding device according to claim 1, wherein the holding member includes hold-down attachments disposed on an outside surface of the "U"-shaped member.

4. The utility holding device according to claim 1, wherein the holding member includes balls atop the upright arms of the "U"-shaped member.

5. The utility holding device according to claim 1, wherein the support base is pivotable with respect to the utility structure, such that the holding member may be rotated to more securely grip elongate objects therein.

6. The utility holding device according to claim 1, wherein: the utility structure comprises a flat panel having top and bottom sides; and the support base further comprises:
   a base member having a bottom surface, the bottom surface being disposed against the top side of the flat panel such that the offset mounting stem and holding member extend away from said top surface; and
   a bolt extending through the flat panel, and attached to the base member so as to secure the base member to the flat panel.

7. The utility holding device according to claim 1, wherein the utility structure is selected from the group consisting of a vehicle cargo rack, a treestand railing, a treestand footrest, vehicle handlebars, and a kickboat frame.

8. The holding device of claim 1, wherein the mounting stem and support base are formed as an integral unit.

9. The holding device of claim 1, wherein the support base terminates at a point where the offset mounting stem extends from the support base.

10. The utility holding device according to claim 1, wherein the support base further comprises:
    a base member having a bottom surface;
    a u-bolt attached to the base member, and configured to surround a bar of the utility structure and secure the bottom surface of the base member thereto.

11. The utility holding device according to claim 10, wherein the orientation of the u-bolt relative to the base member is selectively adjustable, whereby the base member may be secured to the bar in any of a plurality of angular orientations relative to a substantially vertical axis.

12. A utility holding system configured to be attached to a vehicle and to carry elongated objects, comprising:
    a cargo rack disposed on the vehicle, having a cargo space vertically thereabove; and
    a holder attached to the cargo rack, including:
    (1) a support base attached to the cargo rack;
    (2) an offset mounting stem extending upwardly at an incline from the support base; and
    (3) a holding member disposed atop the offset mounting stem and substantially outside the cargo space, and configured to receive an elongate object therein.

13. The utility holding system according to claim 12, wherein the support base is pivotable about a substantially vertical axis, such that the holding member may be rotated to more securely grip elongate objects therein.

14. The utility holding system according to claim 12, wherein the support base further comprises:
    a base member having a bottom surface;
    a u-bolt attached to the base member, and configured to be tightened to grip the bar of the cargo rack to secure it against the bottom surface of the base member.

15. The utility holding system according to claim 12, further comprising a plurality of holders attached to the cargo rack and disposed in alignment such that an elongate object may be supported by the plurality of holders.

16. The utility holding system according to claim 12, wherein the holding member comprises a generally "U"-shaped containment area having two upright arms and being open at the top.

17. The utility holding system according to claim 16, wherein the holding member further comprises opposingly inclined resilient surfaces disposed in the containment area of the "U"-shaped member, for gripping objects placed therein.

18. An offset utility holding system configured to carry elongated objects, comprising:

a cargo rack having an edge and a cargo space thereabove;

a first support base, attached to the edge of the cargo rack;

a first offset mounting stem, extending upwardly at an incline from the first support base and away from the cargo space; and a first holding member disposed atop the first offset mounting stem and configured to receive an elongate object therein, and hold the elongate object substantially outside the cargo space.

19. The utility holding system according to claim 18, wherein the first support base is pivotable about a substantially vertical axis, such that the first holding member may be rotated to more securely grip elongate objects therein.

20. The utility holding system according to claim 18, further comprising:

a second support base attached to the edge of the cargo rack;

a second offset mounting stem extending upwardly at an incline from the second support base and away from the cargo space; and a second holding member disposed atop the second offset mounting stem and configured to receive an elongate object therein, the second holding member being disposed in alignment with the first holding member such that an elongate object may be supported by the first and second holding members and disposed substantially outside the cargo space.

21. The utility holding system according to claim 18, wherein the holding member comprises a generally "U"-shaped containment area having two upright arms and being open at the top, and includes opposingly inclined resilient surfaces disposed in the containment area of the "U"-shaped member, for gripping objects placed therein.

22. An offset utility holding device configured to be attached to a utility structure and to carry elongated objects, comprising:

a support base configured to be attached to the utility structure;

an offset mounting stem extending upwardly at an incline from the support base;

a holding member disposed atop the offset mounting stem at a point below a center of the holding member, the holding member including a generally "U"-shaped member having two upright arms and being open at the top so as to define a containment area configured to receive an elongate object; and the holding member being disposed away from a space directly above the utility structure, such that the elongate object does not interfere with said space.

23. An offset utility holding device configured to be attached to a utility structure and to carry elongated objects, comprising:

a support base configured to be attached to the utility structure;

a holding member disposed upwardly and outwardly from the support base, the holding member including a generally "U"-shaped member having two upright arms and being open at the top so as to define a containment area configured to receive an elongate object;

the holding member being disposed away from a space directly above the utility structure, such that the elongate object does not interfere with said space; and a mounting stem, coupled between a top of the support base and a bottom of the holding member, the mounting stem maintaining the holding member in the upward and outward disposition.

24. An offset utility holding device configured to be attached to a utility structure and to carry elongated objects, comprising:

a support base configured to be attached to the utility structure;

an offset mounting stem extending upwardly at an incline from the support base at a termination point of the support base;

a holding member disposed atop the offset mounting stem, the holding member including a generally "U"-shaped member having two upright arms and being open at the top so as to define a containment area configured to receive an elongate object; and the holding member being disposed away from a space directly above the utility structure, such that the elongate object does not interfere with said space.

* * * * *